US012495762B1

(12) United States Patent
Oliveri

(10) Patent No.: US 12,495,762 B1
(45) Date of Patent: Dec. 16, 2025

(54) COMBINATION WASTE COLLECTION UNIT

(71) Applicant: Bella's Inspiration, Rocky Hill, CT (US)

(72) Inventor: Nadine Oliveri, Wethersfield, CT (US)

(73) Assignee: Bella's Inspiration, Rocky Hill, CT (US)

( * ) Notice: Subject to any disclaimer, the term of this patent is extended or adjusted under 35 U.S.C. 154(b) by 0 days.

(21) Appl. No.: 18/795,915

(22) Filed: Aug. 6, 2024

(51) Int. Cl.
*A01K 1/01* (2006.01)
*A01K 1/015* (2006.01)

(52) U.S. Cl.
CPC ........ *A01K 1/0107* (2013.01); *A01K 1/01577* (2025.08)

(58) Field of Classification Search
None
See application file for complete search history.

(56) References Cited

U.S. PATENT DOCUMENTS

| | | | | |
|---|---|---|---|---|
| 3,745,974 A | * | 7/1973 | Karasz | A01K 1/0121 294/1.3 |
| 5,178,426 A | * | 1/1993 | David | A01K 1/0107 294/1.3 |
| 5,816,195 A | * | 10/1998 | Flynn | A01K 1/0107 119/165 |
| 6,453,844 B1 | * | 9/2002 | Janzen | A01K 1/011 119/161 |
| 8,622,023 B1 | * | 1/2014 | Tierney | A01K 1/0107 119/165 |
| 8,677,532 B2 | | 3/2014 | Legare | |
| 8,689,513 B2 | | 4/2014 | Windmoller | |
| 9,596,962 B2 | | 3/2017 | Davis et al. | |
| 9,631,380 B2 | | 4/2017 | Kadlec | |
| D793,211 S | | 8/2017 | Exley | |
| 10,480,170 B2 | | 11/2019 | Hull | |
| 10,492,462 B1 | * | 12/2019 | Cogley | A01K 1/0245 |
| 10,704,269 B2 | | 7/2020 | Whispell et al. | |
| 10,827,865 B2 | | 11/2020 | Knight et al. | |
| D938,755 S | | 12/2021 | Wu et al. | |

(Continued)

FOREIGN PATENT DOCUMENTS

| | | | | |
|---|---|---|---|---|
| BR | 202013031941 U2 | * | 11/2015 | ........... A01K 1/0107 |
| DE | 102017117099 A1 | * | 1/2019 | ........... A01K 1/0157 |

(Continued)

*Primary Examiner* — Joshua D Huson
*Assistant Examiner* — Alanna K Peterson
(74) *Attorney, Agent, or Firm* — Barclay Damon LLP; Daniel McGrath

(57) ABSTRACT

A combination waste collection unit and method of using the same. The unit includes a tray having a base and four sidewalls extending upwardly around a perimeter of the base. The base includes a sloped surface sloping downwards from a first sidewall towards a second sidewall opposite the first sidewall. The tray defines a trough along the second sidewall, the trough having a greater depth in the container area than the sloped surface. An absorbent pad is sized and shaped to cover the sloped surface. The pad includes a non-absorbent pull-tab along a perimeter. The sloped surface includes a plurality of fasteners and the pad includes a plurality of opposing fasteners each configured to removably couple to one of the fasteners. Each fastener is positioned on the sloped surface to align with an opposing fastener of the pad.

20 Claims, 7 Drawing Sheets

(56) References Cited

U.S. PATENT DOCUMENTS

| | | | |
|---|---|---|---|
| 2005/0284392 A1* | 12/2005 | Hillman | A01K 1/0107 |
| | | | 119/169 |
| 2008/0310996 A1 | 12/2008 | Kim et al. | |
| 2009/0241978 A1 | 10/2009 | Moretti | |
| 2010/0237082 A1 | 9/2010 | Fernandez | |
| 2013/0040099 A1 | 2/2013 | Prewett | |
| 2013/0047928 A1* | 2/2013 | Banasco | A01K 1/0107 |
| | | | 119/165 |
| 2013/0228133 A1* | 9/2013 | Kennington | A01K 1/0114 |
| | | | 119/161 |
| 2018/0344104 A1* | 12/2018 | Ito | A01K 1/01 |
| 2019/0374069 A1 | 12/2019 | Klug | |
| 2020/0100602 A1 | 4/2020 | Waters et al. | |
| 2021/0015073 A1* | 1/2021 | Arika | A01K 1/035 |
| 2021/0051917 A1* | 2/2021 | Ross | A01K 1/0245 |
| 2022/0201972 A1 | 6/2022 | Miles et al. | |

FOREIGN PATENT DOCUMENTS

| | | | | |
|---|---|---|---|---|
| KR | 20100112280 A | * | 10/2010 | A01K 1/0114 |
| KR | 102598328 B1 | * | 11/2023 | B01D 35/16 |

* cited by examiner

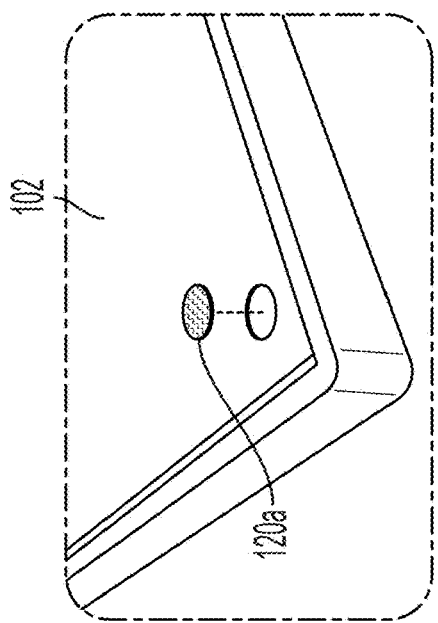
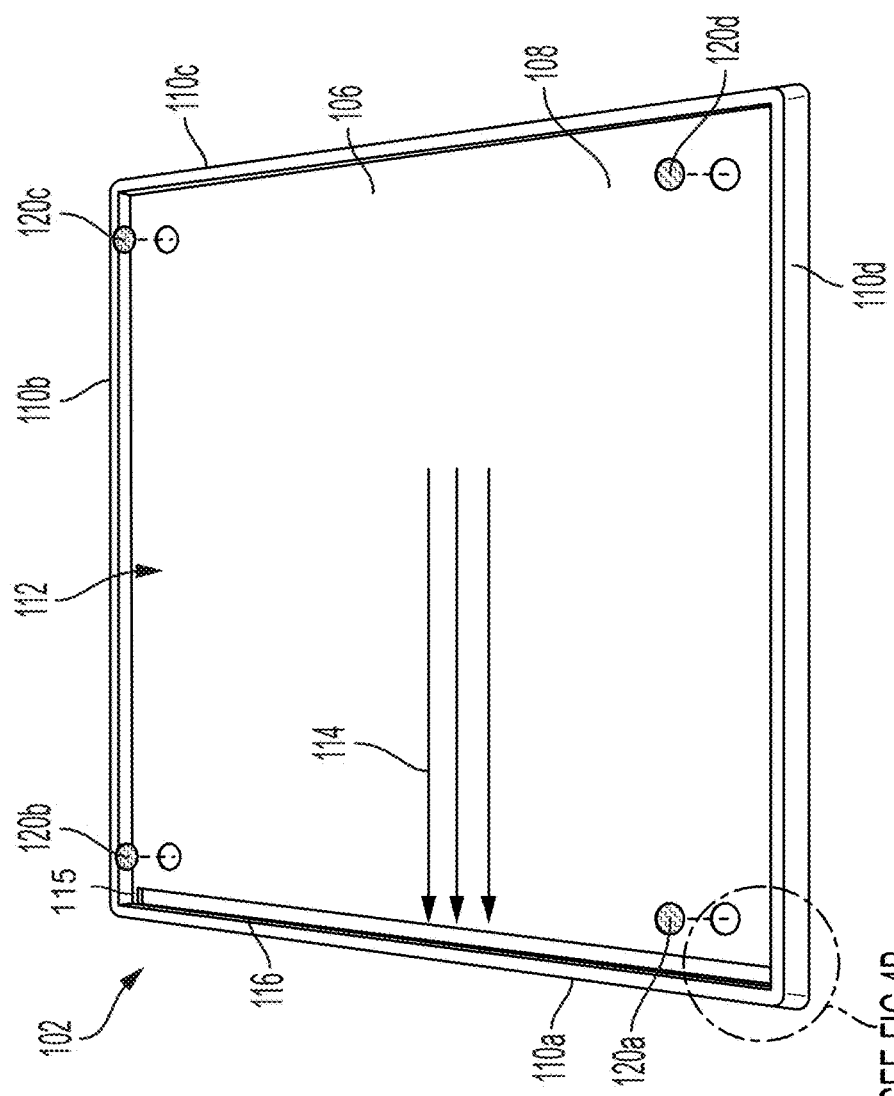
FIG. 4B
FIG. 4A

COMBINATION WASTE COLLECTION UNIT

FIELD OF THE TECHNOLOGY

The subject disclosure relates to waste collection systems, particularly for pets.

BACKGROUND OF THE TECHNOLOGY

While many households enjoy the company of indoor pets, it can be difficult to avoid the occasional mess. This is particularly true for pets that are ordinarily taken outside to pec. For example, while dogs are a very common pet, dogs must be trained before they understand to wait until they are taken outside to pee. Even once trained, older and/or ill dogs may struggle to wait until they are taken outside to pee. In some cases, dogs at a given household must also be tended to the entire time they are outside, for example to prevent them from running off or avoid predators. This can make it difficult and time consuming to avoid the dog peeing in the house. To address these needs, companies have created various types of absorbent pee pads meant to be used indoors.

Existing pee pads suffer from a number of drawbacks in current design and functionality. Most are able to absorb a fixed amount of liquid around a given area where the animal may try to pec. However, sometimes the pee pad cannot absorb enough liquid, or enough liquid fast enough, and urine can soak into the floor, which can cause extreme damage to the surrounding floors. Hardwood, concrete, tile, and especially carpet can be badly damage from urine, and are expensive to repair or replace. Most pee pads also utilize a non-absorbent border, and therefore any urine that reaches the non-absorbent border will quickly run off the pad into the surrounding floor, and urine may sit hidden underneath the pee pad and may not be discovered until pee pad is taken up off the floor. Compounding this problem, animals do not necessarily recognize when they are peeing just off the pee pad, and/or when their urine is escaping from the pad. Dogs have reduced color perception as compared to humans. As a result, they may or may not notice edging on traditional pee pads, and may struggle to recognize the border of the pad.

In addition to the damage to the floor, the urine contains bacteria which is a health hazard. These messes can go unnoticed and, unintentionally, be stepped in, tracking the bacteria throughout the house. Even when the urine does not reach the floor, handling a pee pad covered in urine presents a serious health risk to the handler. Therefore, there are a number of problems with existing options for dealing with animal waste indoors, such pee pads.

SUMMARY OF THE TECHNOLOGY

In light of the needs described above, in at least one aspect, the subject disclosure relates to a combination waste collection unit. The waste collection unit is a combination of two separable components—an absorbent pad which initially absorbs urine and a tray which acts as a liquid collection reservoir beneath the pad as well as a protective boundary between the floor and the pad. The tray acts to contain any urine that runs off the sides or through the pad, while also containing the pad itself and preventing the animal using the unit from accidently urinating on the surrounding floor. To that end, the tray can include a sloped surface underneath the pad which slopes towards a trough along an interior edge of the unit. This funnels urine into the trough, which acts as a collection well. The tray and pad couple together to hold the pad in place for when an animal is using the unit. After the pad has been soiled, the pad can be easily decoupled from the tray by a user, in a sanitary manner, so that the tray can be emptied and cleaned, and the pad can be replaced. Raised edges of the tray help the user to stay within the boundaries of the combined unit, ensuring reduced interaction between the urine and the floor.

As such, the combination waste collection unit provides a system for capturing all urine, or other waste, from an indoor pet. The waste collection unit also allows for easy and effective handling of the pet waste. The unit keeps liquid overflows contained so there is little likelihood of a human or animal stepping in the liquid and making further tracks in the home. The waste collection unit prevents damage to flooring and prevents the need for unsanitary conditions when handling pet waste indoors. Other advantages of the combination waste collection unit will be evident from the detailed disclosure herein.

BRIEF DESCRIPTION OF THE DRAWINGS

So that those having ordinary skill in the art to which the disclosed system pertains will more readily understand how to make and use the same, reference may be had to the following drawings.

FIG. 4a is an overhead perspective view of a tray of the combination waste collection unit of FIG. 1.

FIG. 4b is a cutout view of a corner area of the tray of FIG. 4a.

DETAILED DESCRIPTION

Figure 1:
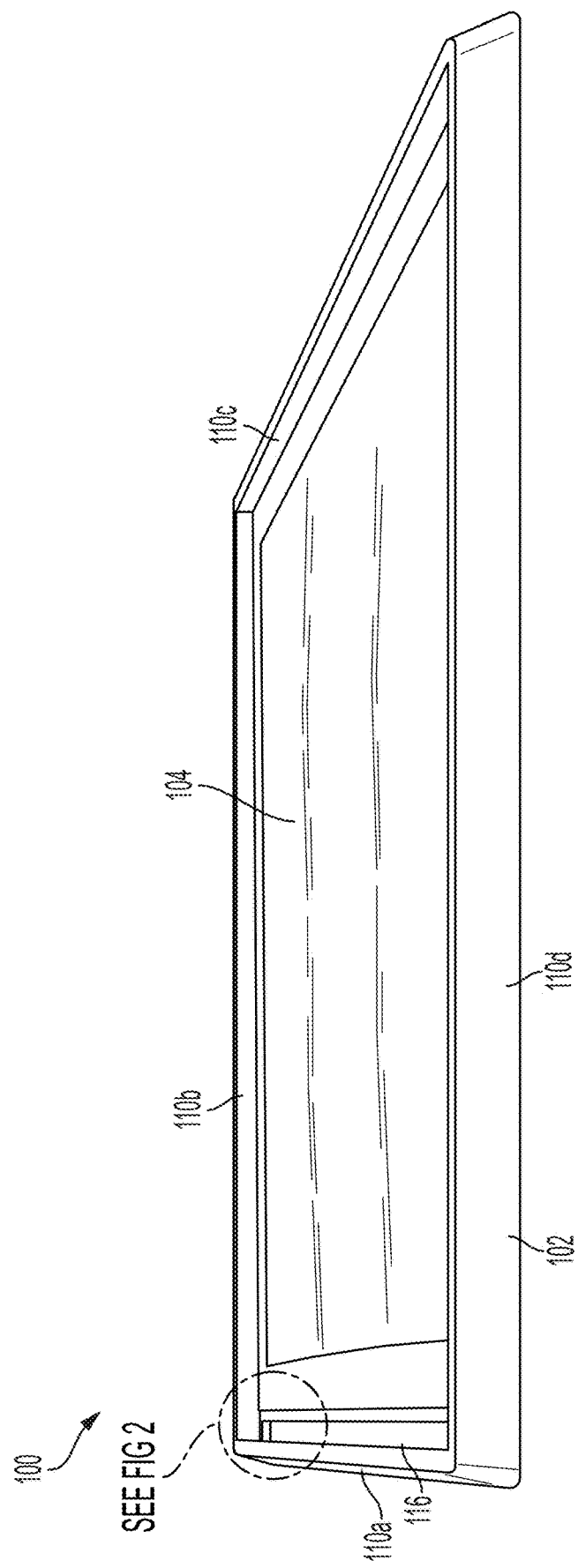
FIG. 1 is an overhead perspective view of a combination waste collection unit in accordance with the subject technology.
Figure 2:
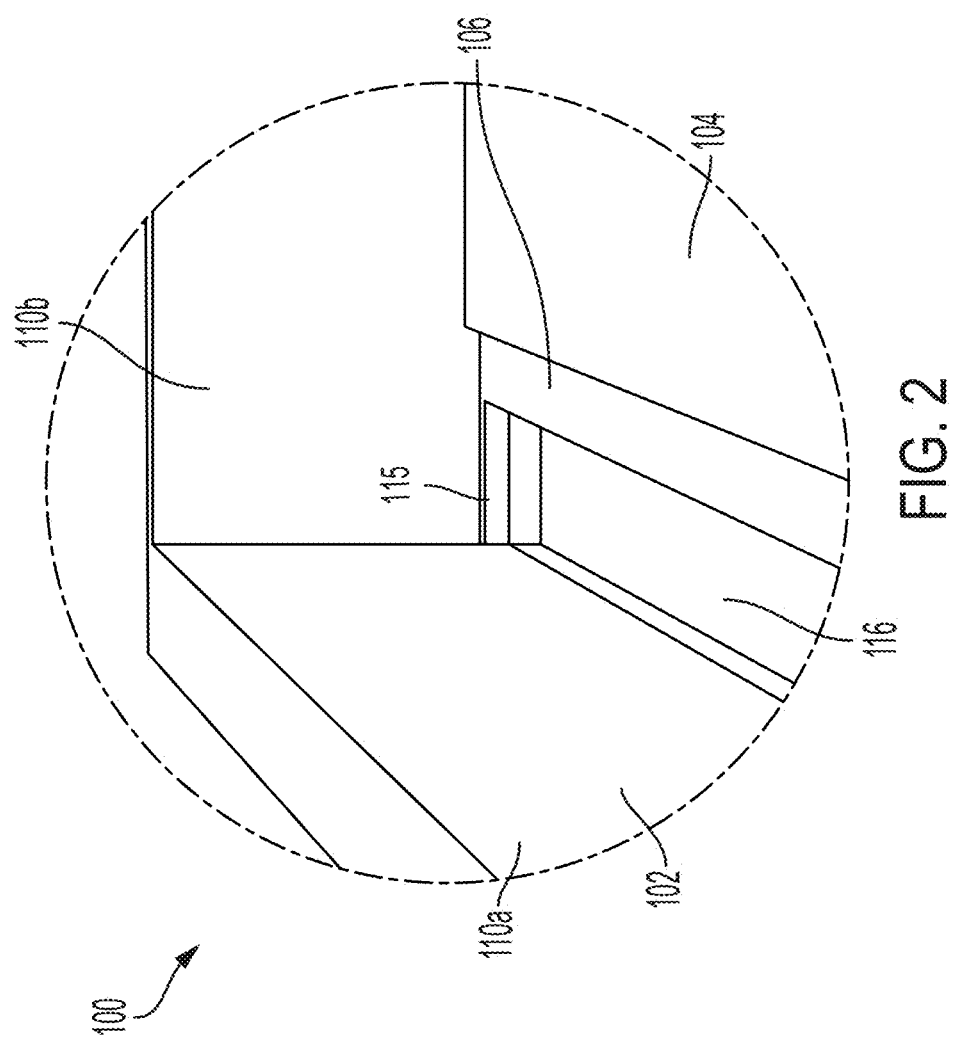
FIG. 2 is a cutout view of a corner area of the combination waste collection unit of FIG. 1.
Figure 3:
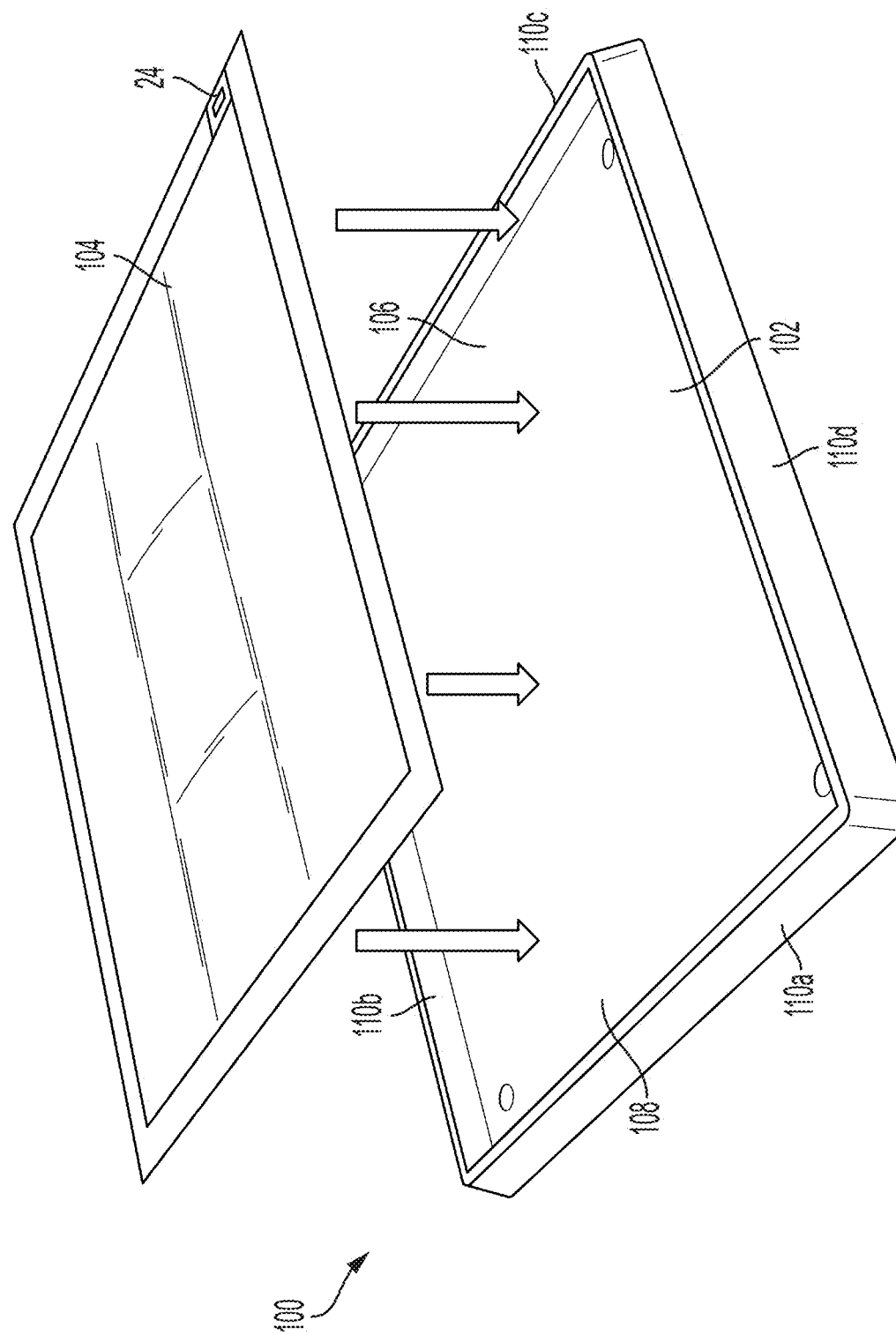
FIG. 3 is an exploded view of the combination waste collection unit of FIG. 1.
Figure 5:
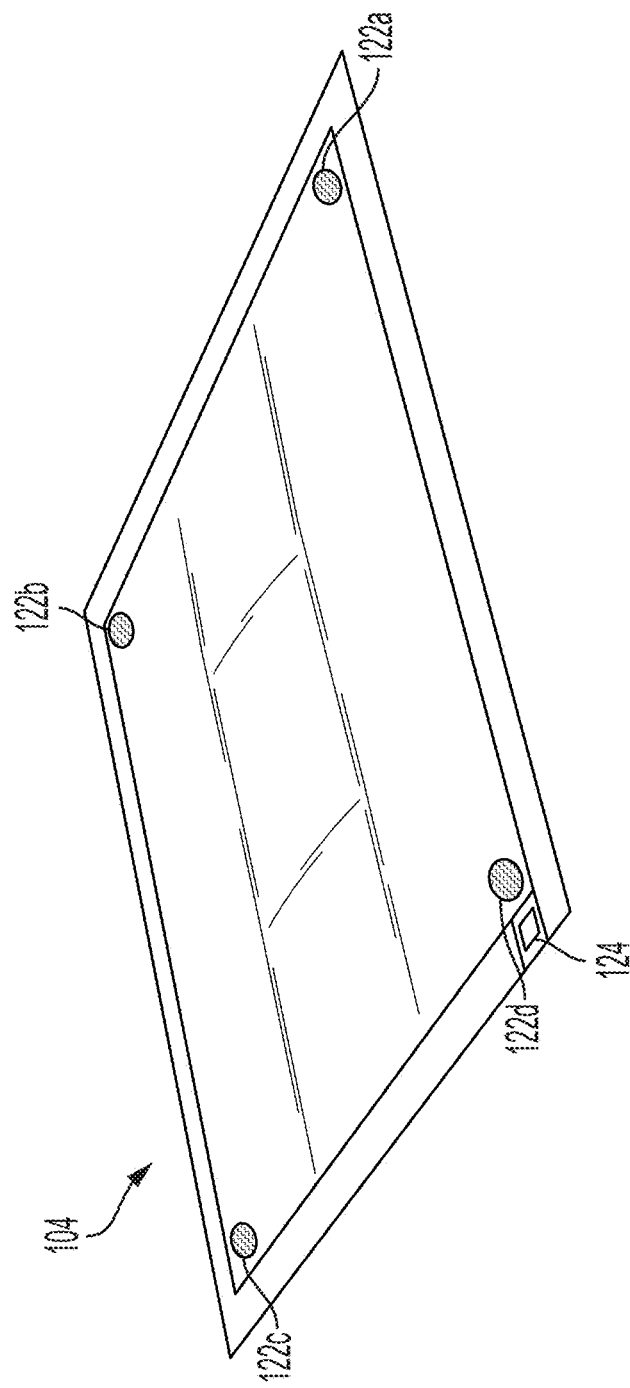
FIG. 5 is a bottom perspective view of a pad of the combination waste collection unit of FIG. 1.

The subject technology overcomes many of the prior art problems associated with prior systems for collecting pet waste. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

Referring now to FIGS. 1-6, a combination waste collection unit 100 is shown. The waste collection unit 100 utilizes a combination of two major parts-a tray 102 and a pad 104. The tray 102 is designed to rest on the floor and is made of a rigid or semi-rigid material which maintains its shape and is able to contain liquid. The pad 104 rests on top of a surface 106 within the tray 102 and is an absorbent material which can absorb liquids such as urine. In use, an animal climbs into the tray 102 and settles on top of the pad 104. The animal will then urinate on the pad 104, with the pad absorbing most of the urine. Excess urine will captured within the tray 102. As will be discussed in more detail below, the pad 104 can generally be a disposable component of the unit 100, which can be easily removed, once soiled, and replaced with a clean pad.

As best seen in FIG. 4*a*, the tray 102 has a base 108, and four sidewalls 110*a*, 110*b*, 110*c*, 110*d* (generally 110) which extend upwardly around a perimeter of the base 108 to define a container area 112 which can hold liquid. The sidewalls 110 can generally be at right angles with respect to adjacent sidewalls 110, and can form a square or rectangular shape. The base 108 includes a large even surface 106 which slopes downwards in the direction of arrows 114, towards a trough 116 that runs along an edge of the base 108 along sidewall 110*a*. In general, the trough 116 has a greater depth than the rest of the container area 112 of the base 108 (i.e. a greater depth than sloped surface 106), thereby forming a collection area for liquid contained by the tray 102. The sloped surface 106 can generally run from the sidewall opposite the trough 116 (e.g. sidewall 110*c*), across the entire length of the base 108 until it reaches the trough 116. The width of the sloped surface 106 can completely cover the area between the other adjacent sidewalls 110*b*, 110*d*. In this way, the sloped surface 106 utilizes gravity to cause all liquid contained by the base 108 to be directed towards the trough 116.

The exact slope of the sloped surface 106 can vary in different embodiments. In general, the slope of the sloped surface 106 is designed to be steep enough to cause all liquid within the tray 102 to flow toward the trough 116, but small enough that the slope will not be noticed by an animal within the tray 102. In some examples, a slope of substantially 5 degrees (i.e. +/−10%) has been found to be effective. In other examples, a slope of between 2-8 degrees has been found to be effective.

Similarly, the exact size of the sidewalls 110 can vary depending on the size of the waste collection unit 100. Different sizes can be offered for expected use cases with different sized animals. In most instances, the sidewalls 100 should have a height of at least half an inch to prevent excess liquid from spilling out of the tray 102. The trough 116 can have a different depth and width depending on the expected use case and/or desired unit size. A trough depth into the base 108 of about a quarter inch from the adjacent portion of the sloped surface 106 has been found to be effective. A trough width of substantially a third of an inch has been found to be effective. While other sizes can also be used, these exemplary sizes generally provide for a liquid collection area that is effectively able to capture excess liquid after an animal uses the unit 100. In some instances, the trough 116 can be truncated rather than extending the entire length of the adjacent sidewall 110*a*. Raised edges 115 are then provided at each ends of the trough 116 between sidewalls 110*b*, 110*d*. These raised edges 115 acts as a stop to reduce the amount of liquid that spills on sidewalls 110*b*, 110*d* when draining tray 102.

The pad 104 and tray 102 are designed to removably couple together. They are removably coupled in that the pad 104 and tray 102 can be temporarily attached together, and when attached, the components will resist any sideways movement when an animal within the unit 100 moves along the pad 104. However, as discussed in more detail below, the unit 100 uses fasteners to which generally provide a weaker coupling force in the vertical direction. When a human applies a firm upward force on the pad 104, the coupling force can be overcome and the pad can be removed. While the pad 104 is almost entirely an absorbent material, the pad 104 can also include a non-absorbent pull-tab 124 along a perimeter of the pad 104. The perimeter can be perforated such that the pull-tab 124 separates the rest of the perimeter. The pull-tab 124 provides an area that a user can easily grip to pull the pad 104 off the tray 102 when disposing the pad 104. Generally, the pull-tab 124 is positioned to run along the sidewall 120*d* opposite the trough 116, to limit contact with urine (given that the sloped surface 106 is angled away from the pull-tab 124).

This coupling force is usually provided by respective fasteners 120*a*, 120*b*, 120*c*, 120*d* (generally 120) on the sloped surface 106 of the tray 102 and opposing fasteners 122*a*, 122*b*, 122*c*, 122*d* (generally 122) on the bottom side of the pad 104. The fasteners 122 are positioned on the pad 104 to align with the fasteners 120 of the tray 102. When the respective fasteners 120, 122 come together, they provide some coupling force and resist movement. For example, in some circumstances, the fasteners 120 and opposing fasteners 122 can be hook-and-loop mechanisms (with hooks on one of the pad 104 or tray 102, and opposing loops on the opposite component). To that end, the tray 102 can include small indented seats within which the hook and or loop pads 120 can rest, as best seen in FIG. 4*b*. Other fasteners 120, 122 could also be used. For example, in some instances, an adhesive may be used as the fastener 122 on the pad 104, with the opposing fasteners 120 on the tray 102 being a contact area for the adhesive to temporarily bond. In yet another example, the fasteners 120 can be four clips made of a soft (not sharp) material that is safe for an animal to step on, and each opposing fastener 122 can be a contact area for one clip. In other instances, the fasteners 120, 122 may be snap fasteners, clips, buttons, dual lock strips, or double sided tape. In the example shown, each fastener 120, 122 is positioned adjacent to a corner of the tray 102 or pad 104, respectively, to help secure the entire pad 104.

Figure 6:
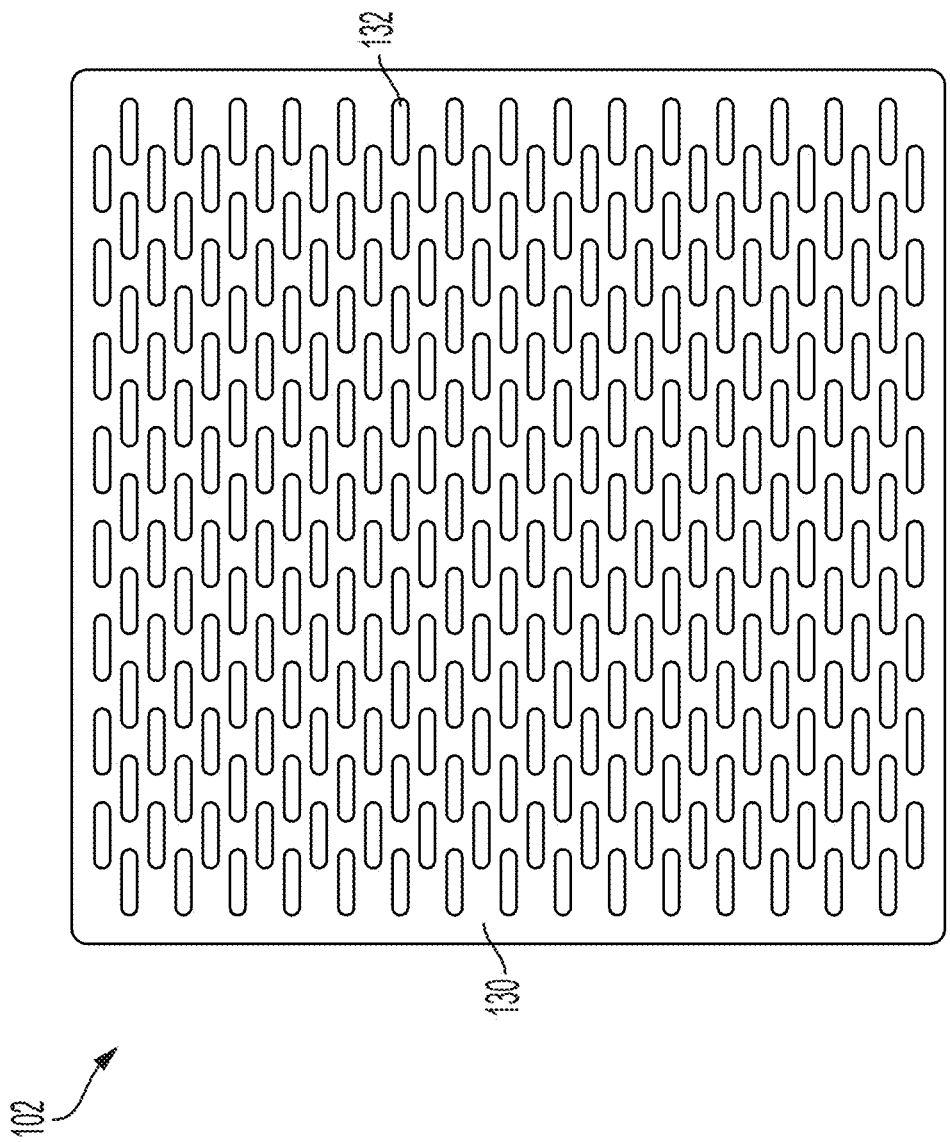
FIG. 6 is a bottom view of the tray of the combination waste collection unit of FIG. 1.

Referring now to FIG. 6, a bottom surface 130 of the tray 102 is shown. The bottom surface 130 contacts the floor to stabilize the waste collection unit 100. The bottom surface 130 is covered in a repeating pattern of ribs 132 to increase friction between the bottom surface 130 and the floor and prevent any slipping. In other embodiments, different gripping patterns can also be used. The pattern repeats across substantially the entire bottom surface 130 to ensure that the tray 102 still sits flat along the floor and remains stable when in use, preventing urine from flowing underneath the tray 102 thus avoiding further floor damage.

Figure 7:
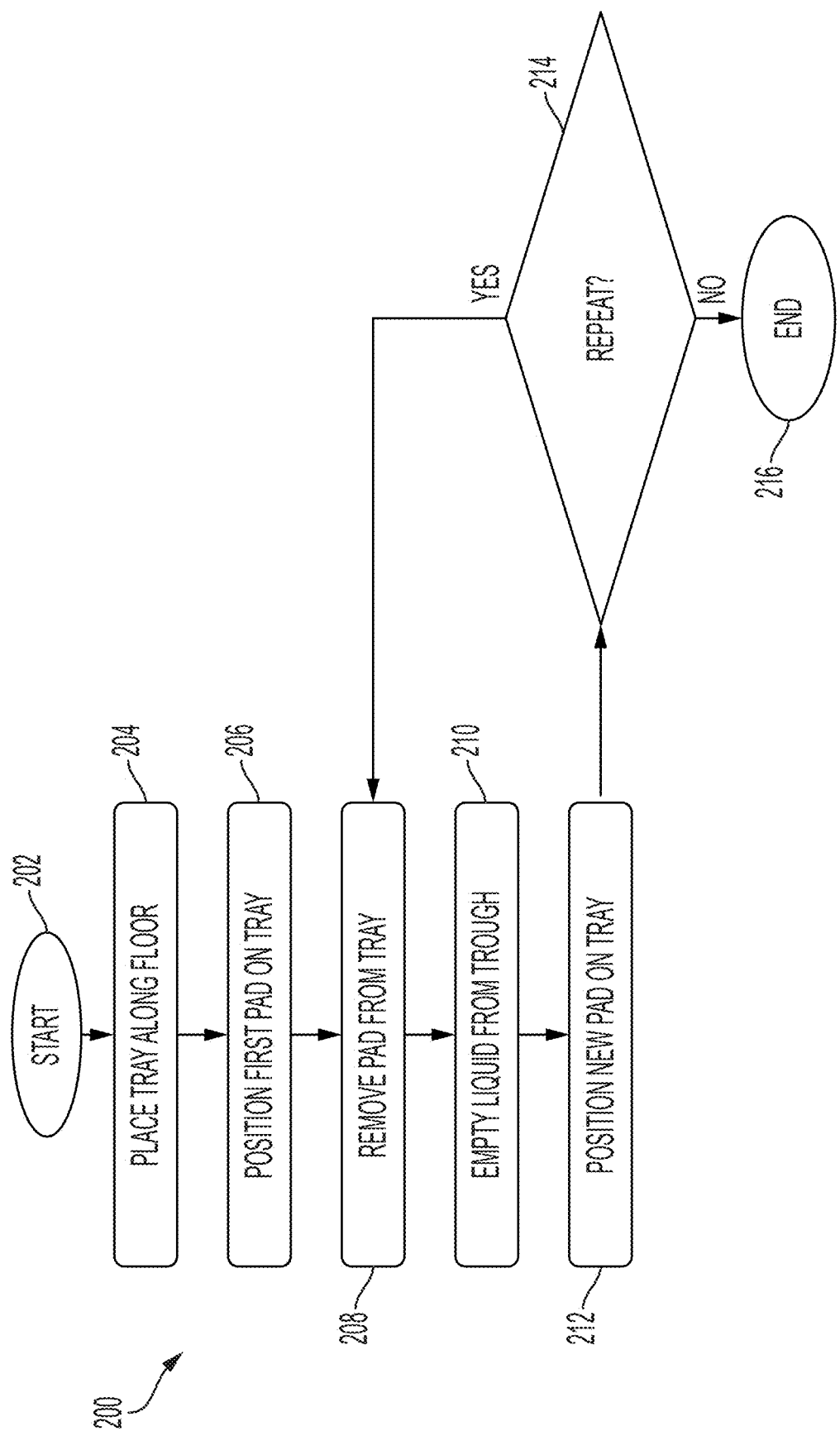
FIG. 7 is a flowchart of an exemplary method of using the waste collection unit of FIG. 1.

Referring now to FIG. 7, a flowchart showing an exemplary use of the waste collection unit 100 is shown generally at 200. The method 200 can be implement the components of the waste collection unit 100, as discussed herein. At step 202, the method of using the waste collection unit starts.

At step 204, a user can place a tray for a waste collection unit along the surface of the floor. The tray can be configured similar to the tray 102 discussed herein. At step 206, an absorbent pad, similar to the pad 104 discussed herein, can be positioned on a sloped surface of the base of the tray. When positioning the pad, fasteners of the tray can be aligned with opposing fasteners of the tab. The fasteners and opposing fasteners can be removably coupled to removably couple the pad and tray.

An animal can then use the waste collection unit by urinating in the unit. After an animal urinates in the unit, urine will be absorbed by the pad, and excess urine will be directed into a trough in the tray. After the unit has been used, the soiled pad can be removed from the waste collection unit, at step 208. This can be done by a user pulling a non-absorbent pull-tab of the pad to pull the pad away from the tray such that the fasteners are decoupled from the opposing fasteners. The soiled pad can then be disposed of.

At step 210, after the pad is removed, the tray can be tipped to empty any remaining liquid from the trough. Additional cleaning of the tray can optionally be done at this time. The tray can then be returned to the floor. At step 212, a new pad can be positioned on the tray. The new pad can be positioned as described in step 206. Particularly, the new pad is positioned such that opposing fasteners of the new pad each removably couple to a respective fastener of the base.

At step 214, the user can determine whether to repeat the previous steps. Whenever an animal soils the new pad, steps 208-212 can be repeated to remove the soiled pad, empty liquid from the trough and tray, and position a new clean pad on the tray. Otherwise, the method can end at step 216. In this way, the waste collection unit can be used to easily and effectively capture pet waste over and over again. The pads can be quickly removed and replaced whenever soiled, while the tray itself can be reused. This all occurs with limited risk for contact between the human user and the animal urine. The tray serves to capture any excess liquid that leaks around or through the pad, ensuring no damages is done to the floor. The tray also provides a structured area within which the animal will know to stay while using the waste collection unit. The waste collection unit is particularly helpful for small dogs who can't or don't go outside, for dogs in apartments with no access directly to outside, and for dogs in the city with little to no access to appropriate relieving areas.

Referring again to FIGS. 1-6, while various materials may be used for the components of the waste collection unit 100, certain materials have been found to be effective. It is particularly important to use materials which pose little to no harm to humans and animals, given that animals will be using the waste collection unit 100 and humans will be handling the waste collection unit 100 to change the pads and clean the unit 100. In general, the materials used will be non-toxic and Bisphenol (BPA), Polyvinyl chloride (PVC), and Phthalate free.

The tray 102, being a reusable component, will generally be a material that can be cleaned with disinfectant products without the material breaking down. In some instances, the tray 102 can be a semi-rigid material such as rubber or silicone. These materials generally maintain their shape when picked up and/or when in use, which allows for the user to easily pick up the tray and drain the collected fluids. Yet these materials are also pliable enough that the tray can also be bent, or in some cases even rolled up, when it is being stored away. The pad 104 can be manufactured from materials such as bamboo, recycled paper, non-woven and woven cloth, polyester, rayon, cotton, gauze, and plastic. The most planet friendly are bamboo, recycled paper, and organic cotton. In some instances, an absorbent gel may be added in between layers of materials, including other non-absorbent materials, to make an absorbent pad.

All references cited herein are incorporated by reference, as though fully set forth herein. All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A combination waste collection unit comprising:
    a tray having a unitary structure with a base and four sidewalls extending upwardly around a perimeter of the base, the tray defining a container area, wherein: the base includes a sloped surface sloping downwards from a first sidewall of the sidewalls towards a second sidewall of the sidewalls, the second sidewall positioned opposite the first sidewall; and the tray defines a trough along the second sidewall and within the base, the trough having a greater depth in the container area than the sloped surface; and
    a pad sized and shaped to cover the sloped surface, the pad being configured to absorb liquid, wherein the pad includes a non-absorbent pull-tab along a perimeter of the pad,
    wherein: the sloped surface includes a plurality of fasteners and the pad includes a plurality of opposing fasteners each configured to removably couple to one of the fasteners, wherein each fastener is positioned on the sloped surface to align with an opposing fastener of the pad.

2. The combination waste collection unit of claim 1, wherein the sidewalls are a uniform height.

3. The combination waste collection unit of claim 2, wherein the sidewalls have a height of at least a quarter of an inch.

4. The combination waste collection unit of claim 1, wherein the sidewalls intersect adjacent sidewalls at right angles, and opposite sidewalls are parallel.

5. The combination of waste collection unit of claim 4, wherein the sidewalls form a square.

6. The combination waste collection unit of claim 1, wherein the entire pad is configured to absorb liquid, with the exception of the pull-tab.

7. The combination waste collection unit of claim 1, wherein a bottom surface of the tray is a ribbed gripping surface.

8. The combination waste collection unit of claim 1, wherein the fasteners include a contact surface and the opposing fasteners include an adhesive.

9. The combination waste collection unit of claim 1, wherein the tray is a rubber or silicone material.

10. The combination waste collection unit of claim 9, wherein the tray is semi-rigid, such that the tray is flexible enough to be rolled up.

11. The combination waste collection unit of claim 1, wherein the waste collection unit consists of materials that are free of Bisphenol (BPA), Polyvinyl chloride (PVC), and Phthalates, and are non-toxic.

12. The combination waste collection unit of claim 1, wherein the sloped surface has a downward slope of substantially 5 degrees.

13. The combination waste collection unit of claim 1, wherein the trough extends lengthwise between a third sidewall and a fourth sidewall, wherein a raised edge connects the trough to the third sidewall and a second raised edge connects the trough to the fourth sidewall.

14. The combination waste collection unit of claim 1, wherein:
the sidewalls include four sidewalls, each at a right angle to adjacent sidewalls;
the first sidewall and the second sidewall have a shared length; and
the sloped surface has a width equal to the shared length.

15. The combination waste collection unit of claim 14, wherein the entire sloped surface is an even surface.

16. The combination waste collection unit of claim 1, wherein:
the trough has a depth of a quarter inch below an adjacent portion of the sloped surface; and
the trough has a width of substantially one third of an inch.

17. A method of using a combination waste collection unit, comprising:
placing a first tray along a floor, the tray having a unitary structure with a base and four sidewalls extending upwardly around a perimeter of the base, the tray defining a container area, wherein: the base includes a sloped surface sloping downwards from a first sidewall of the sidewalls towards a second sidewall of the sidewalls, the second sidewall positioned opposite the first sidewall; and the tray defines a trough along the second sidewall and within the base, the trough having a greater depth in the container area than the sloped surface; and the sloped surface includes a plurality of fasteners;
positioning a first pad of a plurality of pads along the sloped surface of the base such that a plurality of opposing fasteners of the pad each align with a respective fastener of the base, and removably coupling the opposing fasteners to the fasteners, wherein: each pad is sized and shaped to cover the sloped surface; each pad is configured to absorb liquid; each pad includes a non-absorbent pull-tab along a perimeter of the pad;
removing the first pad from the tray by pulling the pull-tab away from the tray to de-couple the fasteners and opposing fasteners;
emptying any liquid within the trough; and
positioning a second pad of the plurality pads along the sloped surface of the base such that a plurality of opposing fasteners of the second pad each align with a respective fastener of the base, and removably coupling said opposing fasteners to the fasteners.

18. The method of claim 17, wherein:
the entire pad is configured to absorb liquid, with the exception of the pull-tab; and
the fasteners and opposing fasteners define a hook and loop fastener system.

19. The method of claim 17, wherein the waste collection unit consists of materials that are free of Bisphenol (BPA), Polyvinyl chloride (PVC), and Phthalates, and are non-toxic.

20. The method of claim 17, wherein:
the sidewalls include four sidewalls, each at a right angle to adjacent sidewalls;
the first sidewall and the second sidewall have a shared length; and
the sloped surface has a width equal to the shared length.

* * * * *